United States Patent

Philbrick

[15] 3,682,129

[45] Aug. 8, 1972

[54] ANNUNCIATOR CIRCUIT FOR FIELD POINT MONITORING SYSTEM

[72] Inventor: Daniel W. Philbrick, Phoenixville, Pa.

[73] Assignee: Robertshaw Controls Company, Richmond, Va.

[22] Filed: Oct. 29, 1970

[21] Appl. No.: 85,111

[52] U.S. Cl. .......................116/65, 137/557, 116/70
[51] Int. Cl. .............................................G08b 1/04
[58] Field of Search..........116/65, 70, 112, 114, 117; 137/551, 557, 558, 413, 82, 78; 235/201

[56] References Cited

UNITED STATES PATENTS

| | | | |
|---|---|---|---|
| 3,038,439 | 6/1962 | Martin et al. | 116/117 |
| 3,223,068 | 12/1965 | Van Winkle | 116/65 |
| 3,318,328 | 5/1967 | Schrader | 137/557 |
| 3,348,772 | 10/1967 | Chabrier et al. | 235/201 |

Primary Examiner—Louis J. Capozi
Attorney—Brenner, O'Brien, Guay & Connors

[57] ABSTRACT

An annunciator circuit for a field point monitoring system in which various ambient conditions such as temperature, pressure, vibration, etc. at a plurality of remote field points are simultaneously monitored. Three pneumatic diverting relays for each field point are cooperatively interconnected to provide a control circuit for use in conjunction with common reset and supply circuits as well as a common audio alarm to produce a normal indication whenever sensed conditions at a particular field point are within suitable tolerance limits, an audio signal accompanied by alternating visual indication initiated upon the detection of an alarm, a steady warning indication upon acknowledgement of e alarm by a central operator, and a normal indication automatically upon the resumption of normal ambient conditions at such field point.

15 Claims, 3 Drawing Figures

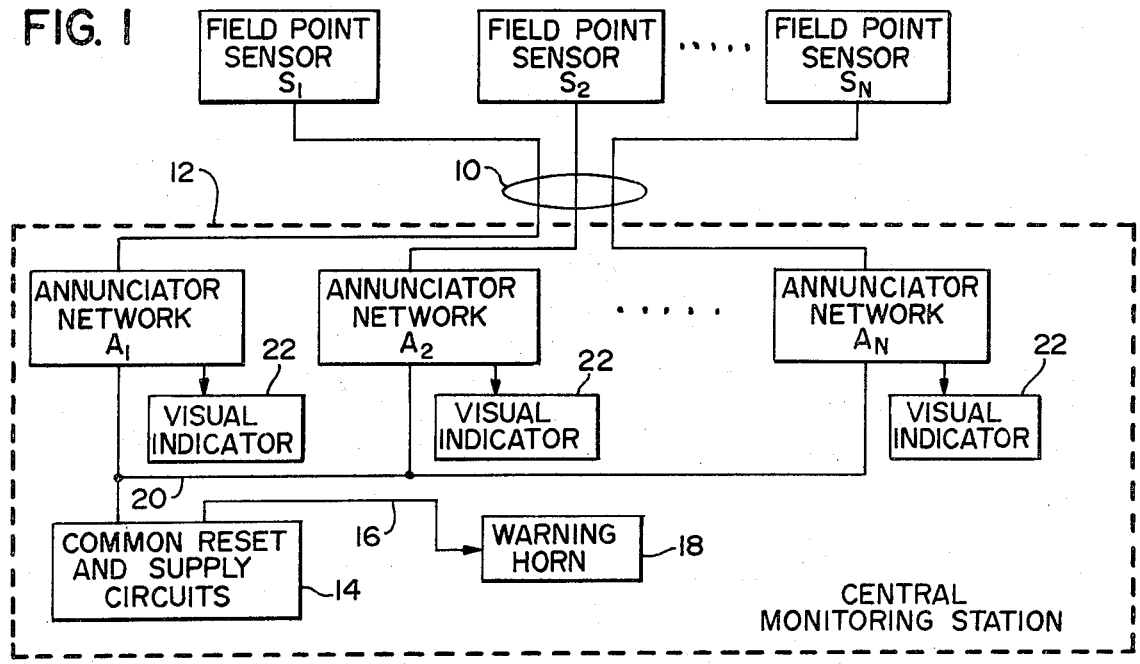
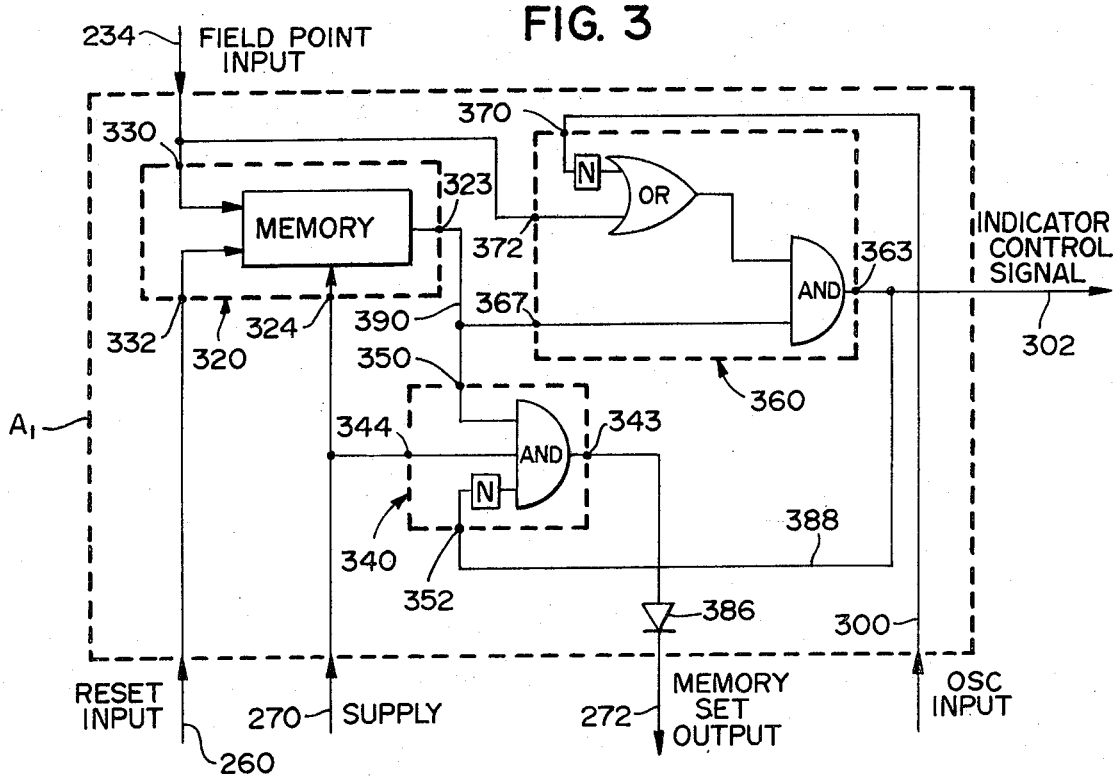
INVENTOR,
Daniel W. Philbrick

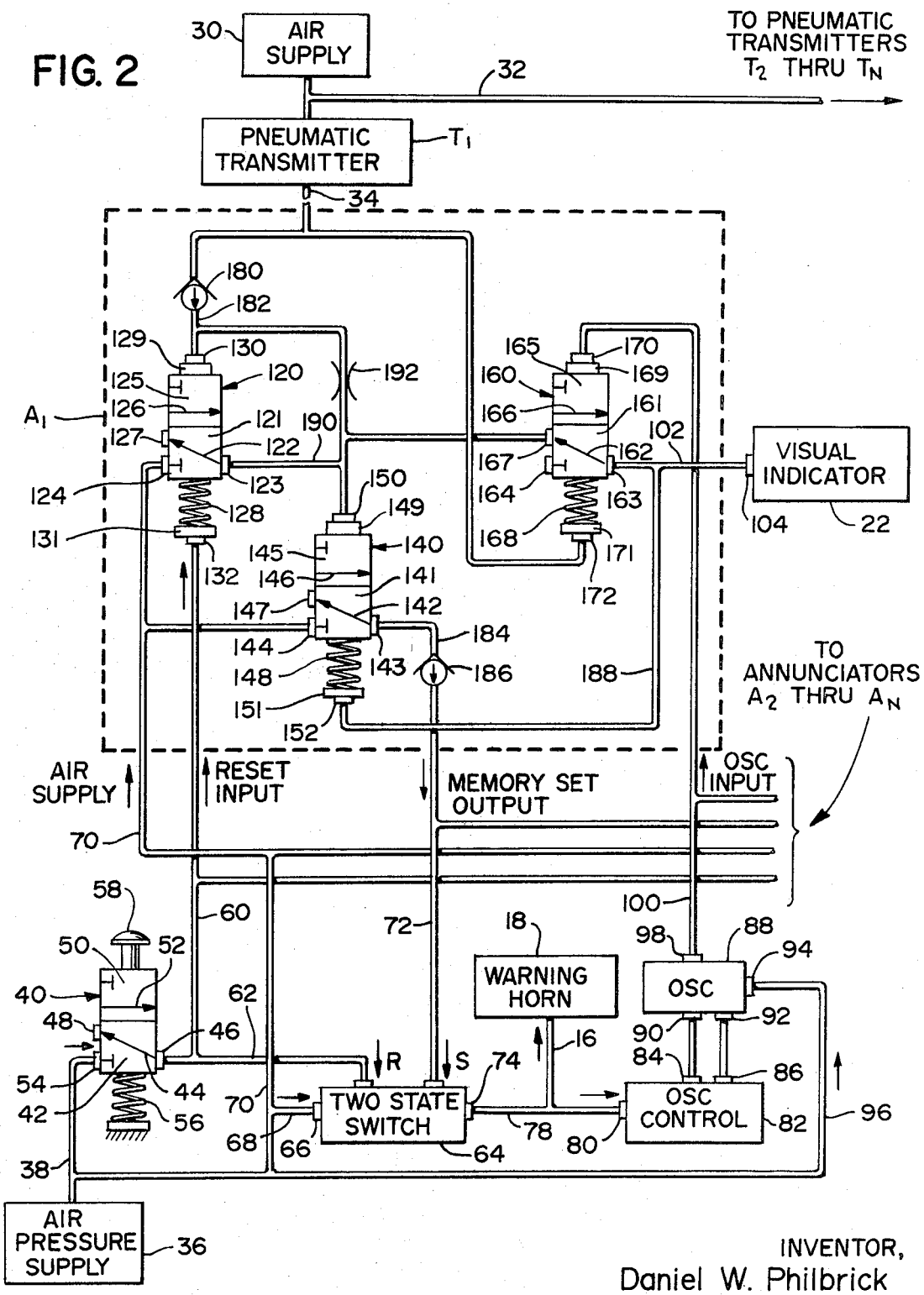

ANNUNCIATOR CIRCUIT FOR FIELD POINT MONITORING SYSTEM

BACKGROUND OF THE INVENTION

1. Field of the Invention

The present invention relates generally to pneumatically operated constant surveillance alarm systems and more particularly to a pneumatic annunciator circuit used with each field point in an alarm system, each circuit being responsive to the status of the connected field point, such circuit utilizing few parts and operatively connected with a common pneumatic circuit to provide a visual and aural indication of the status of a particular variable at a remote point.

2. Description of the Prior Art

Centralized monitoring or supervision of buildings, factories and even entire industrial complexes is becoming increasingly more popular in order to provide increased supervision at reduced manpower costs of the many systems within the surveillance area. The systems to be supervised have greatly varying functional natures such as heating, cooling, lighting, water and electrical power distribution, machine vibration, etc. Thus, an operator at a central monitoring station is normally confronted with a myriad of different field points which must be effectively supervised.

In order to provide an effective field point monitoring system, the central station operator must be quickly and positively apprised of the occurrence of an abnormal or alarm condition and in addition must readily be able to locate the particular field point at which such alarm condition exists so that proper steps may be taken to rectify the faulty system or alarm condition with a minimum of disruption. In the past, conventional attempts to provide an effective field point monitoring system have typically resulted in highly complex electrical, pneumatic and mechanical systems which are costly, cumbersome, and in electrical systems have often necessitated the use of computers. Although many of such device have served the purpose, they have not proven to be entirely satisfactory under all conditions of operation in view of the cost involved and the complexity of the overall system which inherently increases the probability of system breakdown. As a result, systems of this type, while becoming increasingly necessary in order to economically provide reliable supervision of different types of conditions or variables within a large surveillance area, have not been fully exploited in the past and thus have not been used to their full advantage.

SUMMARY OF THE INVENTION

The present invention is characterized in an annunciator circuit in a field point monitoring system having a field point sensor including, in combination, a first control device connected with the field point sensor and having a normal and an actuated state, the first control device assuming and thereafter remaining in its actuated state in response to the output from the field point sensor, an indicator control network selectively actuable to one of first and second operative states, a second control device having a normal and an actuated state and assuming its normal state in response to the generation of a first signal by the field point sensor and being responsive to the indicator control network to switch between its normal and actuated states whenever a second signal is generated by the field point sensor, a third control device having a normal and an actuated state and assuming its actuated state in response to actuation of the first and second control devices, the indicator control network being connected with the third control device and assuming its second operative state in response to actuation of the third control device, and an indicator device connected with the second control device for generating first and second perceptible indications when the second control device is in its normal and actuated states, respectively, whereby the status of a sensed variable at the field point may be readily monitored.

It is an object of the present invention to construct a pneumatic annunciator control circuit for a field point monitoring system utilizing fewer components than heretofore required.

The present invention has an additional object in that a central station operator is both visually and audibly apprised of the occurrence and location of an alarm condition at a remotely disposed field point.

It is a further object of this invention to construct a pneumatic annunciator control network utilizing three fluidic diverting relays which may be identical.

This invention has an additional object in the construction of a pneumatic annunciator control network which may be combined with any desired number of identical control networks with such control networks being connected with a common or central control circuit to provide a multi-point surveillance system capable of indicating a normal condition, the occurrence of an alarm condition, operator acknowledgement, and the resumption of normal operative conditions at each of the field points with the system.

Some of the advantages of the pneumatic annunciator control circuit of the present invention over the prior art are that a field point monitoring system may be simply and economically manufactured, a central station operator may be warned of the occurrence of an abnormal field point condition by both a visual indication and an audible alarm, an operator may readily condition a display panel to indicate the acknowledgement of a received alarm, and an alarm condition may be constantly displayed until such condition is rectified whereupon a normal indication will be automatically generated.

Further objects and advantages of the present invention will become apparent from the following description of the preferred embodiment taken in conjunction with the accompanying drawings.

BRIEF DESCRIPTION OF THE DRAWINGS

FIG. 1 is a block diagram of a field point monitoring system embodying a central station annunciator control circuit or network according to the present invention;

FIG. 2 is a schematic diagram of the annunciator circuit of FIG. 1 illustrating a detail of a single pneumatic annunciator control circuit or network; and FIG. 3 is a schematic logic diagram of the annunciator control circuit or network of FIG. 2.

DESCRIPTION OF THE PREFERRED EMBODIMENT

Referring to FIG. 1, the annunciator circuit of the present invention is embodied in a field point monitoring system having a plurality of remote field point sensors $S_1$ through $S_n$ which may be located at various spaced points throughout an area to be monitored. For example, each of the field point sensors may be located in a particular room or floor of a building so as to detect the occurrence of any one of a desired number of ambient conditions such as pressure, temperature, fluid level, vibration, noise, etc. Upon the detection of such conditions, a signal is developed which is fed through a plurality of lines indicated generally at 10 to a central monitoring station 12 located in a convenient position within the building. The annunciator control circuit of the present invention forms the heart of the central station 12. A number of annunciator control networks $A_1$ through $A_n$ are connected via a main supply bus 20 to common reset and supply circuits 14 which connect via line 16 to a common warning horn 18. An annunciator control network is provided for each of the field point sensors $S_1$ through $S_n$, respectively. Each of the annunciator control networks is connected with a visual indicator 22 to provide a visual indication of the conditions detected at each of the remote field points.

In operation and prior to the occurrence of an alarm at any of the remote monitored points, the warning horn 18 is off and each of the visual indicators 22 displays a normal or green indication notifying the central station operator of the normal state of each of the remote field point sensors.

Upon the occurrence of an alarm condition at any of the remote monitored points, a signal is generated by the corresponding field point sensor and transmitted through lines 10 to its corresponding annunciator control network at the central monitoring station 12. Upon receipt of the alarm signal, the annunciator control network actuates the common reset and supply circuits 14 causing energization of the common warning horn 18. At this same time, the annunciator control network receiving the alarm signal actuates its associated visual indicator 22 causing it to alternately present its normal or green indication and an alarm or red indication. Thus, upon the receipt of an alarm from a particular field point, a warning sound is developed and a visual indication is generated associated with such field point to alert the central station operator of both the occurrence of an alarm and its location.

The central station operator will thereafter actuate a manual reset button to deenergize the warning horn 18 and signal the annunciator control network to discontinue the alternate indications presented by the indicator 22 and maintain the alarm or red indication constantly on. The annunciator network will then maintain the alarm or red indication presented by the visual indicator 22 until the alarm condition sensed at the remote field point is rectified whereupon the system automatically reverts to this initial normal state.

Since a single annunciator network and visual indicator is provided for each of the remote field points, any number of alarms may be received to cause the system to react as described above. In other words, each alarm condition presented by a field point which has been acknowledged by the operator will continue to be indicated by an alarm or red indication at a visual indicator 22, while the subsequent alarm conditions presented at another field point will initiate an identifying flashing or alternating green-red indication accompanied by the energization of the common warning horn 18. In this manner, the operator can readily distinguish between current incoming alarms and those which have been previously acknowledged.

The annunciator circuit of the present invention is preferably embodied in a pneumatic system as is illustrated in detail in FIG. 2. In the system of FIG. 2, each of the field point sensors is supplied with pressurized air from a common field air supply source 30. The output from air supply 30 is fed through a branched conduit 32 to a plurality of spaced field point pneumatic transmitters $T_1$ through $T_n$. Rather than using a common air supply source 30 each of the remotely located transmitters $T_1$ through $T_n$ may be supplied with pressurized air from a single air supply for the entire system or by its own associated air source, if desired. The air supply source selected for the field point sensors will depend upon the contemplated installation of the system.

Each of the pneumatic transmitters $T_1$ through $T_n$ may be of any suitable design such that the air pressure signal from supply 30 will be fed to an output conduit 34 whenever a particular condition to be monitored is within preselected tolerance limits. Upon the occurrence of an alarm condition, however, the pneumatic transmitter will block the flow of pressurized air to conduit 34 for initiating the operation of its associated annunciator control network $A_1$ as will be more fully described below. One exemplary type of transmitter which may be utilized in the present system includes a diverting relay (not shown) which may be of any suitable construction and which may have a movable valving block selectively establishing communication between an input port connected with air supply 30 and an output port connected with conduit 34. The valving block may be suitably biased as by a spring to normally establish communication between the inlet and outlet ports and may be responsive to any one of various pneumatic, mechanical or electrical operators to displace the valving block and isolate the inlet and outlet ports whenever a detected condition such as temperature exceeds a preset safe limit.

A common air pressure supply source 36 is located at the central monitoring station 12 for supplying pressurized air through a branched conduit 38 to a manually operated valve 40. Valve 40 may be of any suitable construction and is schematically illustrated as including a first valving block 42 having an internal passage 44 establishing communication between ports 46 and 48, and a second valving block 50 having an internal passage 52 which, when the valve 40 is operated, establishes communication between ports 46 and 54. The two valving blocks 42 and 50 are normally biased by coil spring 56 to positions wherein port 48 is normally open and port 54 is normally closed, with port 46 designated as a common port. The valving blocks may be moved from their normal positions to their actuated positions by any suitable means such as a two-position manually operated pushbutton 58. Normally closed port 54 is connected to branched conduit 38 with the common port 46 connected through a first branched conduit 60 to the reset input for annunciator control networks $A_1$ through $A_n$ and through a second branched conduit 62 to a reset input port R of a two-state switch or memory network 64.

Two-state switch 64 has an inlet port 66 which is connected via conduit 68 to a branched conduit 70 leading from air pressure supply 36, which also supplies pressurized air to the air supply inputs of the annunciator control networks as illustrated. The two-state switch 64 also has a set input port S which selectively receives an air pressure signal via conduit 72 from the memory set outputs of annunciator control networks $A_1$ through $A_n$. Two-state switch 64 may be of any suitable construction and typically includes a pair of valving blocks (not shown) having internal passages which are so arranged that the inlet port 66 is placed in communication with an outlet port 74 when the valving blocks are in a first or set position and that the outlet port 74 is closed or isolated from input port 66 when the valving blocks are in a second or reset position. The valving blocks of two-state switch 64 are moved between their set and reset positions by suitable diaphragm operators (not shown) which are responsive to pressure input signals applied to the set input port S and the reset input port R such that the valving blocks will be placed in their set position upon receipt of a pressure signal at port S and will remain in such position until moved to their reset positions in response to a pressure signal at port R.

Pressurized air from the outlet port 74 of two-state switch 64 is fed through a conduit 78 to conduit 16 which feeds a conventional pneumatic horn 18 and to a control port 80 of an oscillator control valve 82. Oscillator control valve 82 may be of any suitable construction and is generally similar to the manually operated valve 40 in that a pair of internal valving blocks (not shown) are normally biased to a closed position by a suitable spring blocking flow between an inlet port 84 and an outlet port 86, and are adapted to be moved to an actuated position wherein inlet port 84 is placed in communication with outlet port 86 in response to the actuation of a suitable diaphragm operator (not shown) by a pressure signal applied to control port 80. Thus, outlet port 86 is normally closed or isolated from inlet port 84 and will be placed in communication therewith whenever a pressure signal is applied to control port 80.

A pneumatic oscillator network 88 has a pair of control ports 90 and 92 connected with ports 84 and 86, respectively, of the oscillator control valve 82, an inlet port 94 connected via conduit 96 to air pressure supply 36, and an outlet port 98 which is connected through pneumatic line 100 to the oscillator input of annunciator control networks $A_1$ through $A_n$. The oscillator network 90 may be of any suitable construction for normally providing a constant pressurized signal at its outlet port 98 whenever port 90 is isolated from port 92 by the oscillator control valve 82 and for providing a pulsating or oscillating output pressure signal at port 98 whenever the ports 90 and 92 are placed in communication through control valve 82. One suitable oscillator network, for example, may take the form of a pneumatic astable multivibrator similar to its electrical counterpart wherein a pair of diverting relays having diaphragm controlled internal valving blocks are cross-coupled through a pair of pneumatic delay assemblies which may each include an air accumulator connected with a parallel connected flow restrictor and one-way valve and adjusted to preselect the desired frequency of oscillation. One of the cross-coupling paths of the two diverting relays is broken with each of the two open ends thereof fed to a respective one of ports 90 and 92. In this manner, the oscillator will be free running whenever the oscillator control valve 82 is actuated and will cease oscillating when the oscillator control valve closes.

The output signal from annunciator control network $A_1$ is fed via an output pressure line 102 to the input port 104 of visual indicator 22. The visual indicator 22 may be any monostable (air activated, spring returned) two-positioned pneumatic indicator such as Model 81200-A1 manufactured by the Robertshaw Controls Company. A red-green display is preferred with the red display being presented with no pressure applied and green displayed whenever an air pressure signal is applied to input port 104 from the annunciator control network $A_1$.

The pneumatic annunciator network $A_1$ includes three fluid diverting relays 120, 140 and 160 which may be of any suitable construction and may be identical to each other. Each relay is schematically shown as including a first valving block 121–141–161 having an internal passage 122–142–162 for establishing communication between ports 123 and 127, 143 and 147, and 163 and 167, respectively, and a second valving block 125–145–65 having an internal passage 126–146–166 for establishing communication between ports 123 and 124, 143 and 144, and 163 and 164, respectively. The two valving blocks are normally biased by coil spring 128–148–68 to positions as shown in FIG. 2 wherein port 124–144–164 is normally closed and port 127–147–67 is normally open with port 123–143–163 designated as a common port. Each of the relays 120, 140 and 160 is moved from its normal position to an actuated position by any suitable means, such as a piston and/or diaphragm operator in an actuating chamber 129–149–69 which has a port 130–150–170. In addition, each of the relays may be locked or inhibited from actuation by any suitable means such as a piston and/or diaphragm operator in an inhibit chamber 131–151–1 71 which cooperates with biasing spring 128–148–168 to increase the force exerted thereby to a level sufficiently large to prevent the valving blocks from being moved to their actuating positions by fluid pressure at actuating chamber 129–149–169. Fluid pressure may be placed in communication with inhibit chambers 131, 151 and 171 through ports 132, 152 and 172, respectively, so as to permit selective locking of the relays, as will be explained below.

Referring to the details of the fluid circuit of annunciator control network $A_1$, input conduit 34 from the remotely disposed pneumatic transmitter $T_1$ is connected to port 172 of relay 160 as well as to the inlet end of a one-way valve 180 which has its outlet connected via fluid line 182 to port 130 of relay 120. Pressure conduit 70 from the air pressure supply 36 is connected to port 124 of relay 120 and port 144 of relay 140, while reset conduit 60 is similarly connected to port 132 of relay 120. Port 143 of relay 140 is connected via fluid line 184 to the inlet of a one-way valve 186 which has its outlet connected with conduit 72 to apply pressure signals to set input port S of two-state switch 64.

Pneumatic line 100 from oscillator 88 is connected to port 170 of relay 160 which has its common port 163 connected to supply output pressure signals to conduit 102 as well as to a feedback conduit 188 which is connected at its other end to port 152 of relay 140. Common port 123 of relay 120 is connected via branched fluid line 190 to port 150 of relay 140 as well as to normally open port 167 of relay 160. Common port 123 of relay 120 is also connected to one side of a flow restrictor 192 which is connected at its other end to port 130 via conduit 182.

In operation, when the pneumatic transmitter $T_1$ is sensing a normal condition, a positive pressure signal from air supply 30 is applied to conduit 34 for feeding its associated annunciator control network $A_1$. The pressure signal in line 34 is applied through port 172 to inhibit chamber 171 of relay 160 such that relay 160 is locked in its normal or off position.

The pressure signal in conduit 34 is also applied through one-way valve 180 and port 130 to the actuating chamber 129 of relay 120 causing actuation thereof to place normally closed port 124 in communication with common port 123. With relay 120 actuated, air pressure from supply 36 is fed through line 70 and ports 124 and 123 of actuated relay 120 to branched conduit 190 and thence through restrictor 192 back to its actuating chamber 129. This locks valve 120 in its actuated or open position so that it remains actuated even after the signal from pneumatic transmitter $T_1$ is lost.

The pressure in branched conduit 190 from port 123 of relay 120 is also applied to the normally open port 167 of relay 160. As mentioned above, relay 160 is locked in its normal or off position by the pressure applied to inhibit chamber 171 such that the pressurized air applied to normally open port 167 is passed through to its common or output port 163.

The pressure at output port 163 of relay 160 is applied through conduit 102 to the visual indicator 22 causing it to present the green or normal display for a steady normal indication. The pressure signal from port 163 of valve 160 is also applied via feedback conduit 188 to the inhibit chamber 151 of relay 140 to lock the same in its off or normal position. With relay 140 locked off, the pressure fed from branched conduit 190 to its actuating chamber 149 will have no effect thereon such that port 144 thereof remains blocked.

Two-state switch 64 is initially in its reset position so that warning horn 18 is off and the oscillator control valve 82 is closed whereupon a steady pressure signal is produced on fluid line 100 from the outlet port 98 of oscillator 88. The pressure signal in line 100 is applied through port 170 of valve 160 to the actuating chamber 169 thereof; however, valve 160 remains off due to the pressure applied to inhibit chamber 171.

Thus, in the steady state with the condition detected at the field point within suitable tolerance limits, diverting relay 120 is locked in an actuated or on position, and diverting relay 160 is locked in its normal or off position such that pressurized air from supply 36 is fed through relays 120 and 160 to port 104 of visual indicator 22. The visual indicator 22 thus becomes actuated to produce a steady green or normal indication. The air pressure signal from relays 120 and 160 is also fed back via line 188 to the inhibit chamber of relay 140 which becomes locked in its normal or off position blocking port 144 and precluding the setting of two-state switch 64. Switch 64 is thus maintained in its reset position deenergizing warning horn 18 and inhibiting oscillator 88 from becoming free running.

As soon as an abnormal or alarm condition is sensed at the field point by pneumatic transmitter $T_1$, the flow of air from air supply 30 via pneumatic transmitter $T_1$ is blocked or isolated from conduit 34 such that the pressure within inhibit chamber 171 rapidly decreases to permit diverting relay 160 to be moved to its actuated position in response to the steady pressure signal maintained within actuating chamber 169 by oscillator 88. As diverting relay 160 is actuated, normally open port 167 becomes closed to remove the air pressure signal from the output or common port 163. The loss of pressure at output port 163 causes the visual indicator 22 to present a red indication.

The loss of pressure at output port 163 also relieves the inhibit chamber 151 of diverting relay 140. Since relay 120 is locked on by the feedback signal applied through restrictor 192, the actuating chamber 146 of diverting relay 140 will be maintained pressurized at this time by the signal within branched conduit 190. Therefore, when inhibit chamber 151 becomes vented or relieved, relay 140 moves to its actuated position thereby establishing communication between the now-opened port 144 and common port 143. Pressurized air from air supply 36 and conduit 70 will then pass through relay 140, conduit 184, one-way valve 186 and fluid line 72 to the set input port S of two-state switch 64. It is noted that one-way valve 186 isolates this signal from the corresponding signals from annunciator control networks $A_2$ through $A_n$ which are all connected to two-state switch 64 through common conduit 72.

Upon receipt of the pressure signal at set port S, two-state switch 64 is moved to its set position establishing communication between inlet port 66 and outlet port 74 to feed pressurized air to the warning horn 18 and the control port 80 of oscillator control valve 82. The oscillator control valve 82 will then become actuated to provide a flow path between ports 84 and 86 such that oscillator 88 becomes free-running to pulsate the output pressure signal at port 98 thereof. As a result, the pressure signal at port 170 of relay 160 is pulsated or interrupted such that normally open port 167 is alternately placed in communication with common or outlet port 163. Consequently, the visual indicator 22 is actuated and deactuated causing alternate presentation of the red and green indications.

Thus, upon the occurrence of an alarm, diverting relay 120 remains locked on and relays 140 and 160 become actuated. As a result, two-state switch 64 is placed in its set position thereby energizing the warning horn 18 and initiating operation of the oscillator network 88 to alternately actuate diverting relay 160 causing the alternate operation of visual indicator 22. The central station operator will therefore be apprised of the occurrence of such alarm condition by the sounding of horn 18 accompanied by the alternating red and green indications at the visual indicator 22 associated with the particular pneumatic transmitter which sensed the alarm.

Once the alarm has been received, the operator may acknowledge such condition by depressing pushbutton 58 to place normally closed port 54 of valve 40 in communication with common port 46 whereupon pressurized air from supply 36 will be fed to conduits 60 and 62. The air pressure in conduit 60 is then applied to inhibit chamber 131 of diverting relay 120 causing the same to revert to its normal or off position with port 124 isolated or blocked from port 123. The loss of pressure at port 123 removes operating pressure from diverting relay 160 and therefore from visual indicator 22 causing it to present a red indication. The pressure loss at port 123 also permits diverting relay 140 to revert to its normal or off position closing port 144 and precluding the application of air pressure to the set port S of two-state switch 64.

At this same time, the pressure signal in line 62 from the pushbutton controlled reset valve 40 is applied to reset port R of two-state switch 64 causing port 66 to become closed whereupon the pressure signal at port 74 is removed. As a result, horn 18 is deenergized and oscillator control valve 82 is permitted to return to its normally closed position to interrupt the cross-coupling path of oscillator 88 and stop the oscillation or pulsation of its output at port 98 to once again provide a steady pressure signal in line 100.

Thus, upon acknowledgement of the alarm by depressing pushbutton 58 of valve 40, diverting relays 120, 140 and 160 are placed in their normal or unactuated positions enabling the visual indicator 22 to maintain a red indication. In addition, depression of pushbutton 58 places two-state switch 64 in its reset position deenergizing the warning horn 18 and relieving the oscillator control valve 82 to disable the oscillator network 88. The steady red indication at the central monitoring station notifies the acknowledging operator as well as any subsequent operators that an alarm condition at that particular field point location has been received and acknowledged and still exists.

The red indication presented by visual indicator 22 will thereafter be maintained until the abnormal or alarm condition sensed by pneumatic transmitter $T_1$ is corrected. When the alarm condition is rectified, the pneumatic transmitter $T_1$ will again establish a fluid flow path from air supply 30 to conduit 34 so as to actuate diverting relay 120 which once again becomes locked in such actuated position due to the feedback pressure signal fed through flow restrictor 192. The air pressure signal in conduit 34 also inhibits actuation of diverting relay 160 whereupon pressurized air from supply 36 is fed via fluid line 70, ports 124 and 128 of relay 120, conduit 190, ports 167 and 163 of relay 160 and pneumatic line 102 to the control input port 104 of the visual indicator 22 causing it to present a green indication. The pressure signal at port 163 of relay 160 is also fed to relay 140 via conduit 188 such that actuation thereof is inhibited to preclude the application of a set signal to the two-state switch 64 until a subsequent alarm is received. The annunciator control network $A_1$ is thus automatically placed in its normal or steady state condition to display a green or normal indication as soon as the sensed condition at its associated remote field point once again falls within the desired preselected tolerance limits.

While the annunciator control network $A_1$ has been described and illustrated in FIG. 2 in conjunction with a pneumatic system, similar operation can be obtained through the use of hydraulic fluid rather than pressurized air in accordance with the general principles of operation of the present invention. Moreover, any combination of mechanical or electrical devices may be employed to perform the basic logic functions which are characterized in the operation of the pneumatic annunciator control network $A_1$ of FIG. 2.

FIG. 3 is a schematic logic diagram of the annunciator control network of FIG. 2 wherein universal binary logic symbols are used to represent the logic equivalent of the structure of the annunciator control network and are identified by similar numerals with 200 added thereto.

The three subcircuits 320, 340 and 360 within $A_1$ of FIG. 3 are the binary equivalents of the respective diverting relays 120, 140 and 160 of FIG. 2 with the memory or bistable network 320 being equivalent to diverting relay 120, flow restrictor 192 and one-way valve 180 combined. The network interconnections of the logic circuit of FIG. 3 are identical to those described with respect to FIG. 2 and will not be described again for the sake of brevity.

Memory circuit 320 of FIG. 3 will provide an output signal at terminal 323 when placed in its actuated state upon the receipt of an input signal at terminal 330 from line 234. The output signal at terminal 323 will be maintained after the memory network has been actuated until the network is reset by the application of a signal at terminal 332.

Subcircuit 340 is equivalent to diverting relay 140 of FIG. 2 and includes a three input AND gate having two of its inputs connected directly to terminals 344 and 350 and its third input terminal connected through a NOT device N to terminal 352. A NOT device, of course, has a single input and a single output with the output present only when there is no input. Thus, any time signals appear at terminals 344 and 350 and the signal at terminal 352 is absent, an output signal will be generated at terminal 343.

The binary equivalent to diverting relay 160 is illustrated at 360 of FIG. 3 and includes an AND gate having its output connected to terminal 363 and one of its inputs connected with terminal 367. The other input terminal of the AND gate is connected to receive the output from an OR gate having a first input connected directly with terminal 372 and a second input connected with terminal 370 via a NOT device N. In this manner, it can be seen that network 360 will provide an output signal at terminal 363 whenever an input signal is present at terminal 367 at the same time as a signal is either present at terminal 370 or absent from terminal 370.

Referring to the overall operation of the annunciator control network as represented in the logic diagram of FIG. 3, memory circuit 320 is directly responsive both to actuating commands from the field point transmitters and to reset commands from the manually operated reset valve to be placed and thereafter maintained in either an actuated or on position or a deactuated or off position, respectively. With the memory network 320 on, logic circuits 340 and 360 are primed or preconditioned for actuation by the signal applied to terminals 344, 350 and 367 such that logic circuit 360 will provide a high or low level output signal to an indicator in response to the presence or absence, respectively, of a signal from the remote field point or in response to the absence or presence, respectively, of an output from the oscillator via line 300. Logic circuit 360 thus senses both the state of the field point sensor and the operative condition of the central station oscillator. With logic circuit 340 primed, an output signal will be provided thereby at terminal 343 whenever logic circuit 360 signals the occurrence of an alarm and logic circuit 320 has not been reset.

Thus, it can be seen that even though the annunciator circuit of the present invention is simple in construction, it effectively enables the rapid and positive recognition of the occurrence of an alarm condition by an operator at a central console in a field point surveillance system and utilizes common reset and supply circuits to reduce system complexity and cost. It should also be noted that the present invention permits the use of identical diverting relays so as to further reduce costs while contemporaneously simplifying the assembly of the overall system.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. In a field point monitoring system including field point sensing means generating a first signal when a sensed variable is within preselected tolerance limits and a second signal when the sensed variable is outside such tolerance limits, the combination comprising first control means connected with the field point sensing means and having a normal state and an actuated state, said first control means assuming and thereafter remaining in said actuated state in response to the generation of the first signal by the field point sensing means, indicator control means selectively actuable to one of first and second operative states, second control means connected with said first control means, said indicator control means and the field point sensing means and having a normal state and an actuated state, said second control means assuming said normal state in response to the generation of the first signal by the field point sensing means and being responsive to said indicator control means to switch between said normal and actuated states whenever the second signal is generated by the field point sensing means, third control means connected with said first control means and said second control means and having a normal state and an actuated state, said third control means assuming said actuated state in response to actuation of said first and second control means, said indicator control means being connected with said third control means and assuming said second operative state in response to actuation of said third control means, and indicator means connected with said second control means for generating first and second perceptible indications when said second control means is in said normal and actuated states, respectively, whereby the status of the sensed variable may be readily monitored.

2. The invention as recited in claim 1 further including reset means connected with said indicator control means and said first control means for selectively placing said first control means in its normal state and said indicator control means in its first operative state.

3. The invention as recited in claim 2 wherein said indicator means comprises a visually perceptible indicator display, and further including an audible alarm connected with said indicator control means and generating an audibly perceptible signal when said indicator control means is in said second operative state.

4. The invention as recited in claim 3 wherein said indicator control means includes oscillator means connected with said second control means for alternately placing said second control means in said normal and actuated states when said indicator control means is in said second operative state.

5. The invention as recited in claim 1 wherein said first control means comprises a pressure operated relay having an outlet port communicating with said second and third control means, said pressure operated relay having a second port and being moved to an actuated position in response to a particular fluid pressure at said second port, and wherein a flow restrictor communicates with said second port and said outlet port to provide a feedback path for locking said pressure operated relay in its actuated position.

6. The invention as recited in claim 1 wherein each of said first, second and third control means comprises a respective one of first, second and third pressure operated fluidic relays.

7. The invention as recited in claim 6 wherein each of said first, second and third pressure operated fluidic relays has an inlet port, an outlet port, a third port and a fourth port, each of said pressure operated fluidic relays moving to an actuated position in response to fluid pressure at said third port and being locked in a normal position in response to fluid pressure at said fourth port.

8. The invention as recited in claim 7 wherein said outlet port of said first pressure operated relay communicates with said inlet port of said second pressure operated relay and said third port of said third pressure operated relay.

9. The invention as recited in claim 8 wherein said outlet port of said second pressure operated relay communicates with said indicator means and said fourth port of said third pressure operated relay.

10. The invention as recited in claim 9 wherein said fourth port of said second pressure operated relay communicates with the field point sensing means, and wherein said outlet port of said third pressure operated relay communicates with said indicator control means.

11. A pneumatically operated control network including a first control means having first and second inputs and an output, said first control means assuming a first position in response to the presence of a signal at said first input, said first control means presenting a signal at said output when in said first position, said first control means remaining in said position upon subsequent removal of said signal at said first input, said control means assuming a second position in response to the presentment of a signal at said second input, said first control means remaining in said second position upon removal of a signal presented to said second input provided a signal is not present at said first input;

a second control means having three inputs and an output, one of said three inputs being connected with said d output of said first control means, another of said three inputs being connected to said first input of said first control means, said second control means having a first position providing a connection between said one of said three inputs and said output of said second control means, said first position being provided so long as a signal is presented at said another of said three inputs, said second control means providing a second position to remove said connection between said one of said three inputs and said output of said second control means, said second position being provided when a signal is not presented at said another of said three inputs with a signal presented at the last of said three inputs; and a third control means having two inputs and an output, the first of said two inputs connected with said output of said second control means, the second of said two inputs connected with the output of said first control means, said third control means presenting a first position so long as a signal is presented at said first of said two inputs of said third control means, said third control means presenting a second position providing a signal at said output of said third control means, said second position being provided when a signal is not present at said first of said two inputs of said third control means with a signal presented at said second of said two inputs of said third control means, said output of said third control means providing a control signal output for the network.

12. A pneumatically operated control network in accordance with claim 1 wherein said output of said second control means provides an output for the network indicative of the signal status at said first input of said first control means provided a signal is applied to said last of said inputs of said second control means.

13. A pneumatically operated control network in accordance with claim 1 wherein said second input of said first control means provides a means for resetting said first control means following the removal of said signal at said first input of said first control means.

14. A pneumatically operated control network in accordance with claim 1 further including a one-way valve connected to said output of said third control means to provide a control signal output for the control network.

15. In a pneumatically operated constant surveillance alarm system for monitoring a plurality of field points each of which present a signal so long as the field point is not in an alarm condition with an indicator for each field point and a common control network providing a control signal output at which a control output signal is normally presented with a pulsating control output signal presented at the control signal output in response to an input control signal and providing an operator controlled reset signal the combination, one for each field point, comprising a first control means having first and second inputs and an output, said first input connecting to a field point, said first control means assuming a first position in response to the presence of a signal at said first input, said first control means presenting a signal at said output when in said first position, said first control means remaining in said position upon subsequent removal of said signal at said first input, said second input connected to receive the reset signal from the common control network, said control means assuming a second position in response to the presentment of the reset signal at said second input, said first control means remaining in said second position upon removal of a signal presented to said second input provided a signal is not present at said first input;

a second control means having three inputs and an output, said output of said second control means connecting with an indicator, one of said three inputs being connected with said output of said first control means, another of said three inputs being connected to said first input of said first control means, said second control means having a first position providing a connection between said one of said three inputs and said output of said second control means, said first position being provided so long as a signal is presented at said another of said three inputs, said second control means providing a second position to remove said connection between said one of said three inputs and said output of said second control means, said second position being provided when a signal is not presented at said another of said three inputs with a signal presented at the last of said three inputs, said last of three inputs connecting with the control signal output of the common control network; and a third control means having two inputs and an output, the first of said two inputs connected with said output of said second control means, the second of said two inputs connected with the output of said first control means, said third control means presenting a first position so long as a signal is presented at said first of said two inputs of said third control means, said third control means presenting a second position providing a signal at said output of said third control means, said second position being provided when a signal is not present at said first of said two inputs of said third control means with a signal presented at said second of said two inputs of said third control means; and a one-way valve connecting said output of said third control means with said central control network to provide the input signal for the central control network.

* * * * *